US011065986B2

(12) United States Patent
Emrich et al.

(10) Patent No.: US 11,065,986 B2
(45) Date of Patent: Jul. 20, 2021

(54) LONGITUDINAL ADJUSTER FOR A VEHICLE SEAT, AND VEHICLE SEAT

(71) Applicant: ADIENT ENGINEERING AND IP GMBH, Burscheid (DE)

(72) Inventors: Holger Emrich, Erdesbach (DE); Michael Koenig, Rodenbach (DE); Martin Reischmann, Hoehfroeschen (DE); Frank Rheinheimer, Boechingen (DE); Ralf Velten, Heltersberg (DE); Thomas Bingert, Otterberg (DE); Erik Dick, Otterberg (DE)

(73) Assignee: Adient Engineering and IP GmbH, Burscheid (DE)

( * ) Notice: Subject to any disclaimer, the term of this patent is extended or adjusted under 35 U.S.C. 154(b) by 0 days.

(21) Appl. No.: 16/629,188

(22) PCT Filed: Jun. 29, 2018

(86) PCT No.: PCT/EP2018/067540
§ 371 (c)(1),
(2) Date: Jan. 7, 2020

(87) PCT Pub. No.: WO2019/011667
PCT Pub. Date: Jan. 17, 2019

(65) Prior Publication Data
US 2020/0130538 A1   Apr. 30, 2020

(30) Foreign Application Priority Data

Jul. 14, 2017 (DE) .................... 10 2017 212 081.9

(51) Int. Cl.
*B60N 2/06* (2006.01)
*B60N 2/02* (2006.01)
*B60N 2/42* (2006.01)

(52) U.S. Cl.
CPC .......... *B60N 2/067* (2013.01); *B60N 2/0232* (2013.01); *B60N 2/43* (2013.01)

(58) Field of Classification Search
CPC ...... B60N 2/015; B60N 2/0232; B60N 2/067; B60N 2/0705; B60N 2/0715; B60N 2/43
See application file for complete search history.

(56) References Cited

U.S. PATENT DOCUMENTS 2,961,032 A * 11/1960 Pickles ................ B60N 2/0232
248/429
3,661,352 A * 5/1972 McFarlane ............. B60N 2/072
248/429

(Continued)

FOREIGN PATENT DOCUMENTS

DE 10046204 A1 6/2002
DE 10201092 A1 7/2003

(Continued)

OTHER PUBLICATIONS

The International Bureau of WIPO, The International Preliminary Report on Patentability, issued in PCT/EP2018/067540, dated Jan. 14, 2020, 15 pages, with English translation, The International Bureau of WIPO, Geneva, Switzerland.

(Continued)

*Primary Examiner* — James M Ference
(74) *Attorney, Agent, or Firm* — Marshall & Melhorn, LLC

(57) ABSTRACT

A longitudinal adjuster for a vehicle seat having at least one pair of rails. The at least one pair of rails may be formed from a first seat rail for connecting to a seat structure, and from a second seat rail for connecting to a vehicle structure. The seat rails of the pair of rails are displaceable in the longitudinal direction relative to each other and mutually engage around each other to form an inner channel. A securing profile, which is fastened to the first seat rail, is (Continued)

Figure 1:
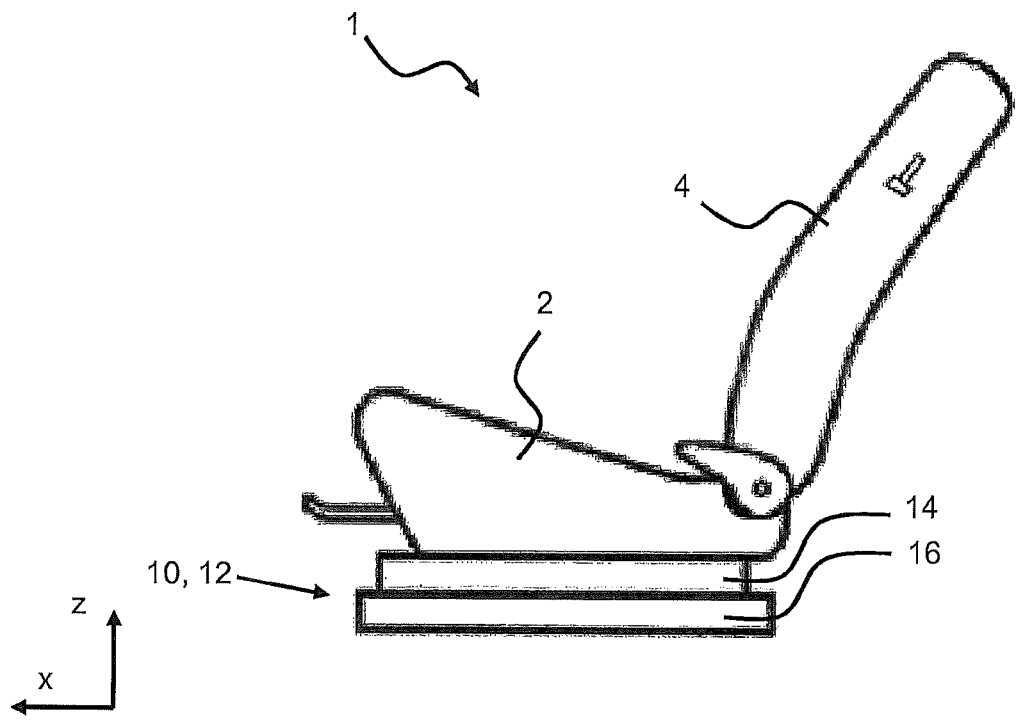

arranged in the inner channel. A rack which is fixed relative to the second seat rail is arranged in the inner channel. The securing profile and the rack are normally spaced apart from each other and enter into engagement with each other in a form-fitting manner in reaction to a predetermined action of force.

13 Claims, 5 Drawing Sheets

(56) References Cited

U.S. PATENT DOCUMENTS

| | | | | |
|---|---|---|---|---|
| 4,042,276 A * | 8/1977 | Breitschwerdt | ...... | B60N 2/0825 297/216.18 |
| 5,918,846 A * | 7/1999 | Garrido | ......... | B60N 2/123 248/424 |
| 5,931,436 A * | 8/1999 | Rohee | ............ | B60N 2/0705 248/430 |
| 5,957,535 A * | 9/1999 | Pasternak | ......... | B60N 2/0705 248/429 |
| 8,196,888 B2 * | 6/2012 | Yamada | ............ | B60N 2/0818 248/429 |
| 8,757,577 B2 * | 6/2014 | Naoki | ............ | B60N 2/085 248/429 |
| 9,145,070 B2 * | 9/2015 | Hayashi | ............ | B60N 2/0705 |
| 9,180,796 B2 * | 11/2015 | Markel | ............ | B60N 2/0732 |
| 2002/0033625 A1 * | 3/2002 | Goy | ............ | B60N 2/4214 297/344.18 |
| 2005/0224680 A1 * | 10/2005 | Strubel | ............ | B60N 2/0732 248/429 |
| 2005/0230591 A1 * | 10/2005 | Smith | ............ | B60N 2/0715 248/429 |
| 2006/0131470 A1 * | 6/2006 | Yamada | ............ | B60N 2/0705 248/424 |
| 2006/0261238 A1 * | 11/2006 | Rohee | ............ | B60N 2/0705 248/430 |
| 2009/0007718 A1 * | 1/2009 | Beneker | ............ | B60N 2/0818 74/535 |
| 2009/0102224 A1 * | 4/2009 | Rohee | ............ | B60N 2/0155 296/65.14 |
| 2009/0322136 A1 * | 12/2009 | Kazyak | ............ | B60N 2/0875 297/344.1 |
| 2011/0057085 A1 * | 3/2011 | Nonomiya | ............ | B60N 2/168 248/429 |
| 2011/0057086 A1 * | 3/2011 | Nonomiya | ............ | B60N 2/0747 248/430 |
| 2011/0198464 A1 * | 8/2011 | Hoge | ............ | B60N 2/0715 248/223.41 |
| 2011/0308340 A1 * | 12/2011 | Bosecker | ............ | B60N 2/067 74/89.32 |
| 2012/0104218 A1 * | 5/2012 | Nonomiya | ............ | B60N 2/167 248/429 |
| 2014/0027600 A1 * | 1/2014 | Kato | ............ | B60N 2/0843 248/429 |
| 2014/0224954 A1 * | 8/2014 | Oh | ............ | B60N 2/0705 248/429 |
| 2014/0353454 A1 * | 12/2014 | Yamada | ............ | B60N 2/0818 248/430 |
| 2015/0191106 A1 * | 7/2015 | Inoue | ............ | B60N 2/0705 248/429 |
| 2015/0210187 A1 * | 7/2015 | Harleb | ............ | B60N 2/0705 248/429 |
| 2016/0107545 A1 * | 4/2016 | Pluta | ............ | B60N 2/123 297/344.1 |
| 2016/0114703 A1 * | 4/2016 | Fujita | ............ | B60N 2/0825 297/344.1 |
| 2018/0319297 A1 | 11/2018 | Traiser et al. | | |
| 2020/0130538 A1 * | 4/2020 | Emrich | ............ | B60N 2/0705 |

FOREIGN PATENT DOCUMENTS

| | | |
|---|---|---|
| DE | 102004001593 B3 | 8/2005 |
| DE | 10210555 B4 | 12/2005 |
| DE | 102012015343 A1 | 1/2014 |
| DE | 202015106016 U1 | 2/2017 |
| EP | 0242859 A2 | 10/1987 |
| EP | 0900689 A1 | 3/1999 |
| EP | 2070761 A2 | 6/2009 |
| FR | 2901192 A1 | 11/2007 |

OTHER PUBLICATIONS

European Patent Office, International Search Report with Written Opinion, issued in PCT/EP2018/067540, dated Sep. 20, 2018, 16 pages, European Patent Office, Rijswijk, Netherlands.

* cited by examiner

LONGITUDINAL ADJUSTER FOR A VEHICLE SEAT, AND VEHICLE SEAT

The invention relates to a longitudinal adjuster for a vehicle seat, in particular motor vehicle seat, having at least one pair of rails, which is formed from a first seat rail, in particular for connecting to a seat structure, and from a second seat rail, in particular for connecting to a vehicle structure, wherein the seat rails of the pair of rails are displaceable in the longitudinal direction relative to each other and mutually engage around each other, thereby forming an inner channel. The invention furthermore relates to a vehicle seat.

PRIOR ART

DE 102 10 555 B4 discloses a longitudinal adjuster of the type in question and a vehicle seat of the type in question. The longitudinal adjuster comprises two seat rails which are displaceable relative to each other, namely an upper rail and a lower rail, which mutually engage around each other. The seat rails each comprise stop means, wherein the stop means provide an additional connection between the upper rail and the lower rail in the event of a crash. Forces occurring in the event of a crash are then additionally introduced via said stop means from the upper rail and the lower rail into the vehicle structure.

PROBLEM

The invention is based on the problem of improving a longitudinal adjuster of the type mentioned at the beginning, in particular of increasing the strength of the longitudinal adjuster in the event of a crash, and of providing a corresponding vehicle seat.

SOLUTION

This problem is solved according to the invention by a longitudinal adjuster for a vehicle seat, in particular motor vehicle seat, having at least one pair of rails, which is formed from a first seat rail, in particular for connecting to a seat structure, and from a second seat rail, in particular for connecting to a vehicle structure. The seat rails of the pair of rails are displaceable in the longitudinal direction relative to each other and mutually engage around each other, thereby forming an inner channel. A securing profile which is fastened to the first seat rail is arranged in the inner channel, and, furthermore, a rack which is fixed relative to the second seat rail is arranged in the inner channel. The securing profile and the rack are normally spaced apart from each other and enter into engagement with each other in a form-fitting manner in reaction to a predetermined action of force, for example in the event of a crash.

Owing to the fact that a securing profile is fastened to the first seat rail in the inner channel and, furthermore, a rack is arranged in the inner channel, wherein the securing profile and the rack are normally spaced apart from each other and enter into engagement with each other in a form-fitting manner in reaction to a predetermined action of force, for example in the event of a crash, it is made possible in a particularly advantageous manner for the load-bearing capacity of the longitudinal adjuster, in particular in the case of what are referred to as integrated belt seats, to be able to be increased in situations having comparatively very high crash loads both in the vertical direction and in the longitudinal direction. Furthermore, according to the proposed solution, loading of a conventional rail lock for adjusting a seat longitudinal position is reduced, and therefore overloading of the rail lock is prevented. Furthermore, it is advantageous that an additional load absorption by means of the securing profile and the rack is active exclusively in the event of a crash and no restrictions take place during normal use of the longitudinal adjuster.

The wording "spaced apart from each other" in the context of the invention is also intended to be understood in particular as meaning that the components mentioned in each case, in the above context, for example, the securing profile and the rack, can mutually surround each other in sections, but do not have any direct contact with each other here.

Advantageous refinements which can be used individually or in combination with one another are the subject matter of the dependent claims.

The rack can have a toothing having downwardly directed teeth. The rack can be connected, in particular welded, at least in a front portion to the second seat rail, in particular by means of an adapter. The rack can be guided out of the inner channel to the rear and can be connectable to a vehicle structure in a rear portion, in particular by means of an adapter.

The teeth of the toothing can each have two tooth flanks which are inclined toward each other in the direction of a tooth tip. The teeth can have a rectangular or trapezoidal cross section.

The toothing of the rack can be a helical toothing. The downwardly directed surface of the rack can be curved. The toothing can be part of a thread. The rack can be a threaded rod. The rack can be a spindle.

The teeth can have a tooth thickness in the range of 0.15 mm to 5 mm, in particular an average tooth thickness in the range of 0.15 mm to 5 mm, as measured in the longitudinal direction. An average tooth thickness is understood as meaning the tooth thickness in the region of half of the tooth height. The tooth thickness can generally preferably be dimensioned in such a manner that, in the event of a crash, deformation of the teeth because of the engagement of the securing profile is prevented. The teeth can have a tooth height in the range of 0.25 mm to 5 mm, preferably in the range of 0.3 mm to 1 mm, as measured in the vertical direction. The tooth height and also by this means a depth of the tooth gaps can generally preferably be dimensioned in such a manner that, in the event of a crash, a sufficient depth of the tooth gaps is provided for the engagement of the securing profile.

The securing profile can have a substantially L-shaped cross section. The securing profile can be screwable, in particular in a horizontal portion, to the first seat rail. The securing profile can have a through opening, in particular in a vertical portion. The securing profile can engage around the rack. The rack can penetrate the through opening of the securing profile. In particular in the region of a lower wall of the through opening, the securing profile can have a mating toothing, cooperating with the toothing of the rack.

A tooth distance between two adjacent teeth can be larger than the thickness of the securing profile, in particular of a vertical portion of the securing profile.

This problem is furthermore solved according to the invention by a vehicle seat having a previously described longitudinal adjuster, wherein the vehicle seat has a seat structure which is connected to a first seat rail of the longitudinal adjuster.

FIGURES AND EMBODIMENTS OF THE INVENTION

Before refinements of the invention are described in greater detail below using figures, it should first of all be noted that the invention is not restricted to the described components or the described method steps. Furthermore, the terminology which is used is also not of a restrictive nature, but rather has merely an exemplary character. If the singular is used below in the description and the claims, the plural is included in each case, insofar as the context does not explicitly rule this out.

Figure 2:
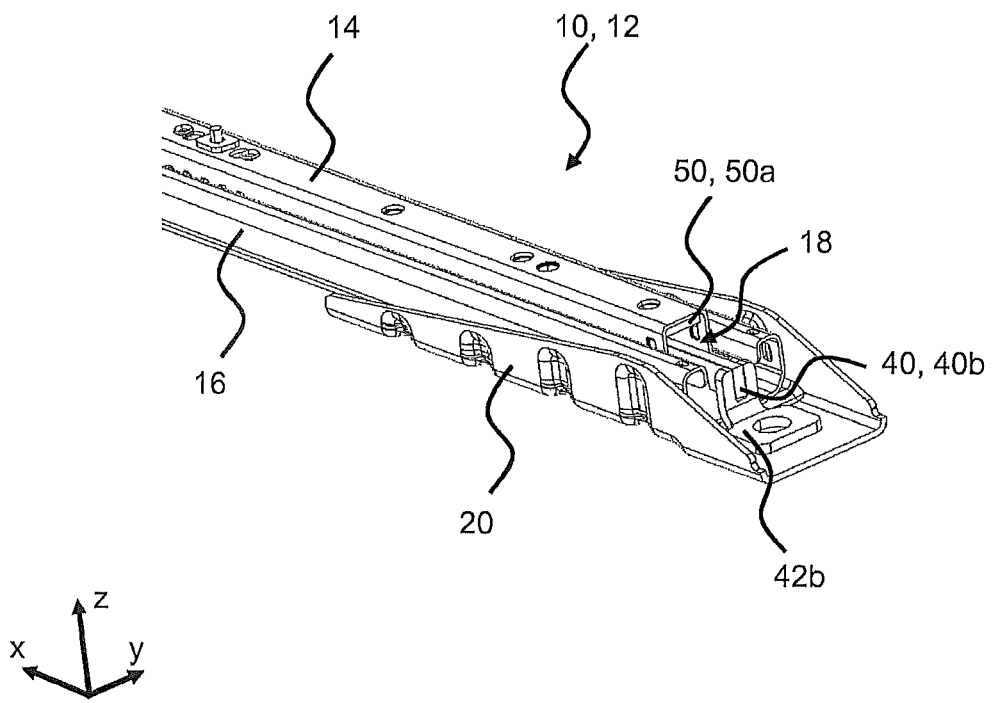
Figure 3:
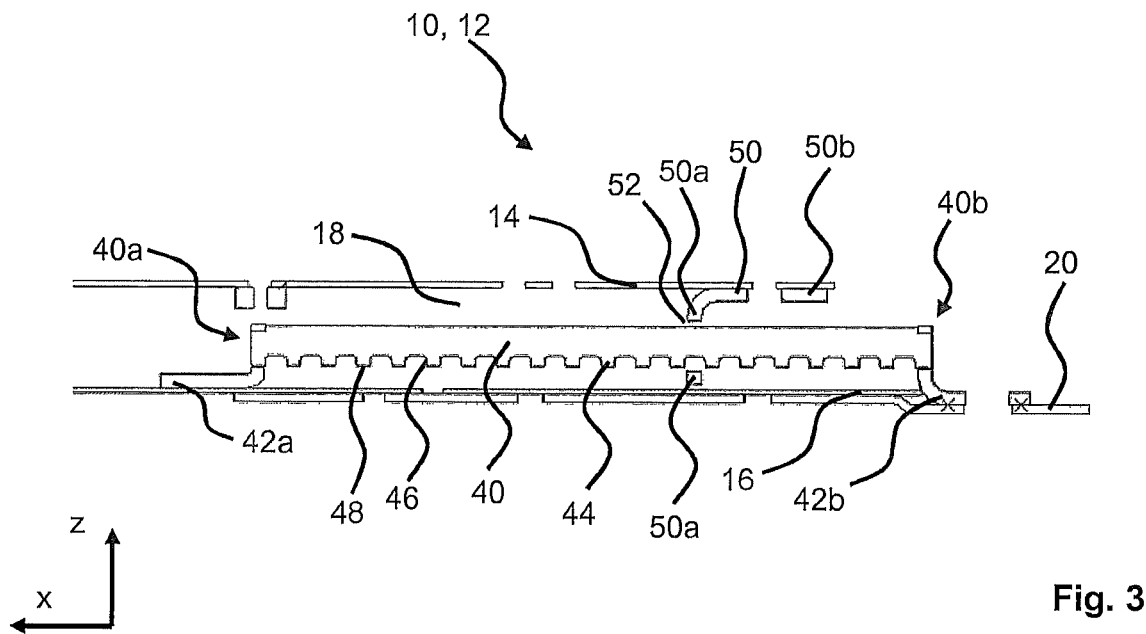
Figure 4:
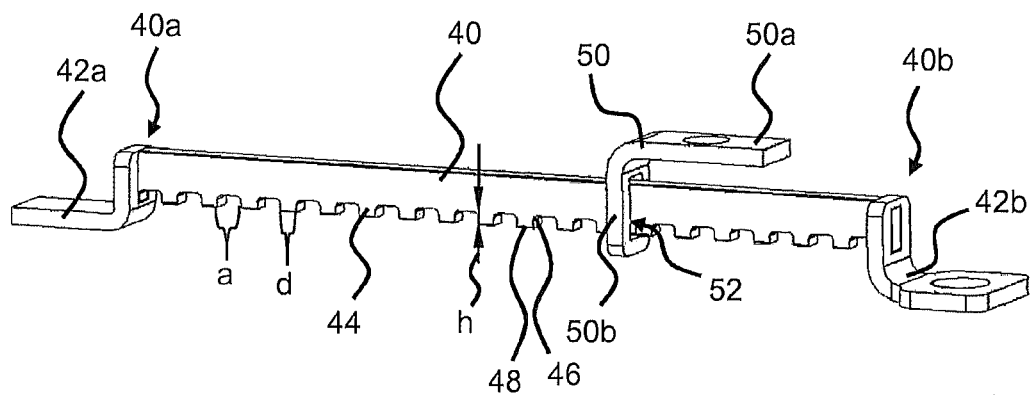
Figure 5:
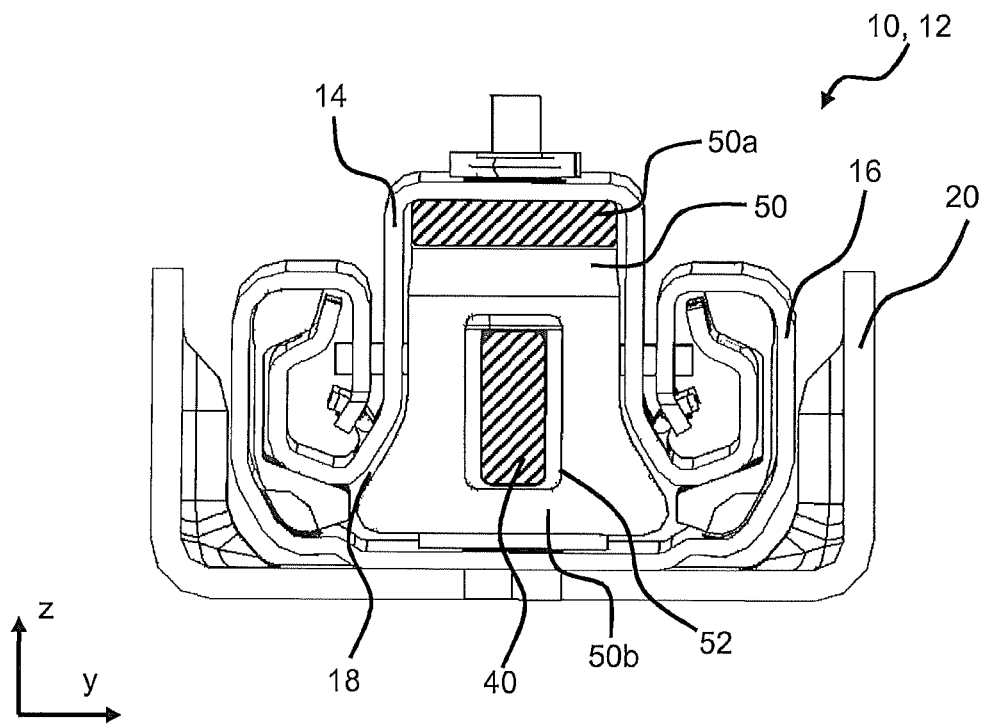
Figure 6:
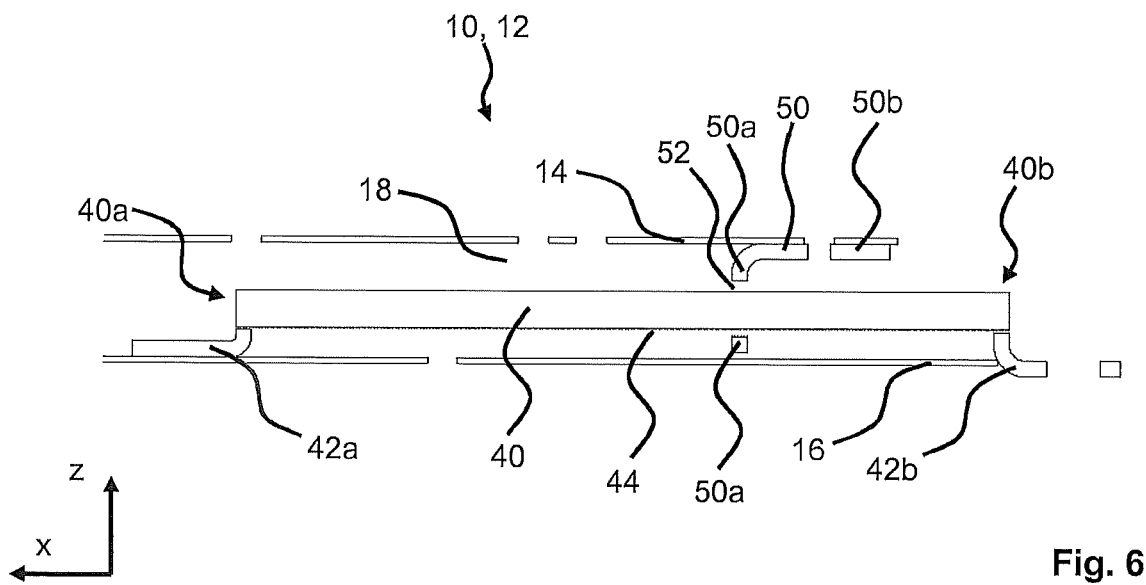
Figure 7:
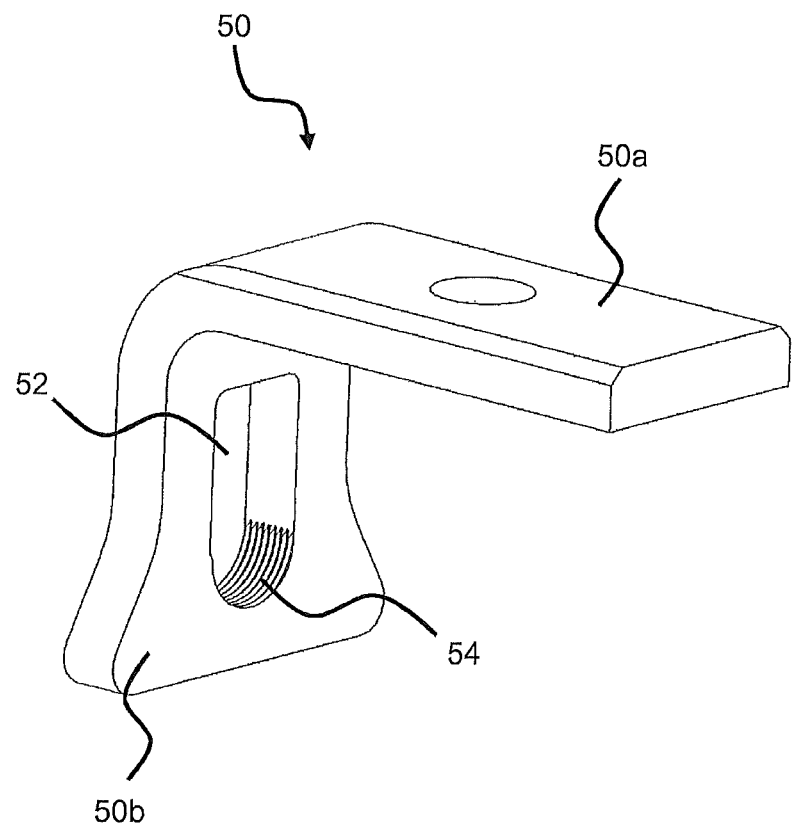
Figure 8:
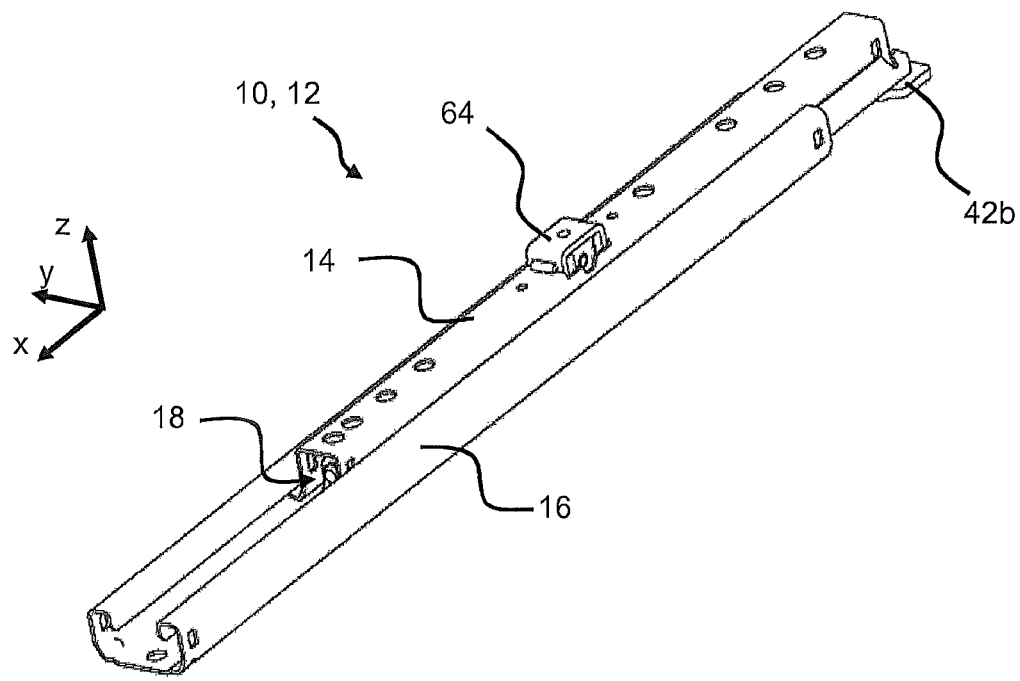
Figure 9:
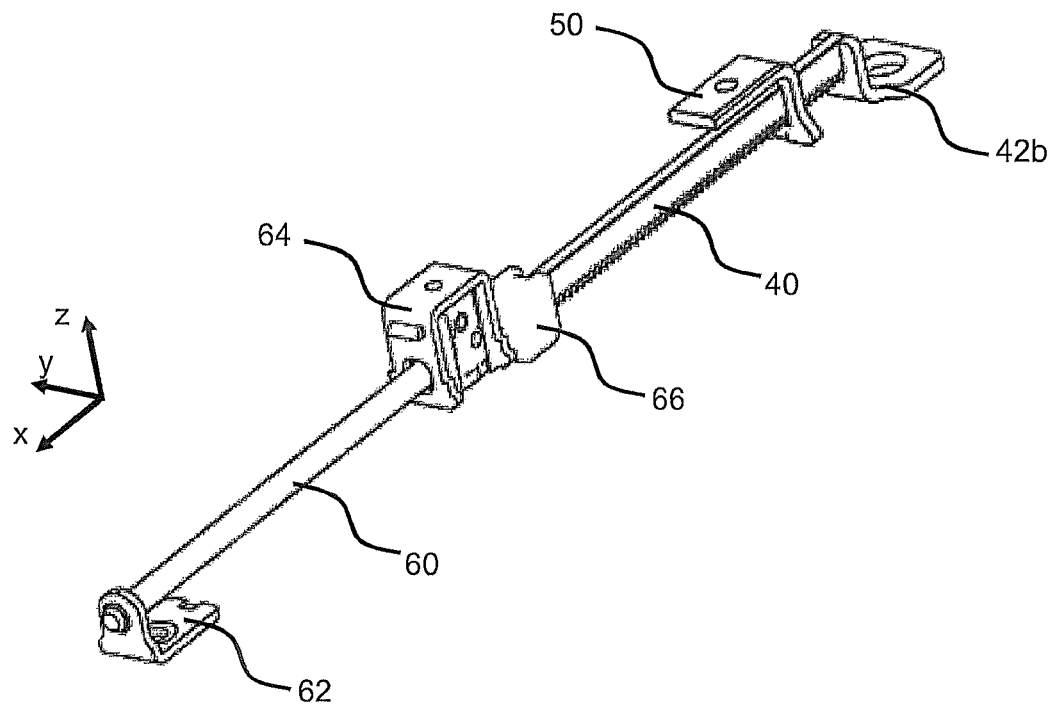
Figure 10:
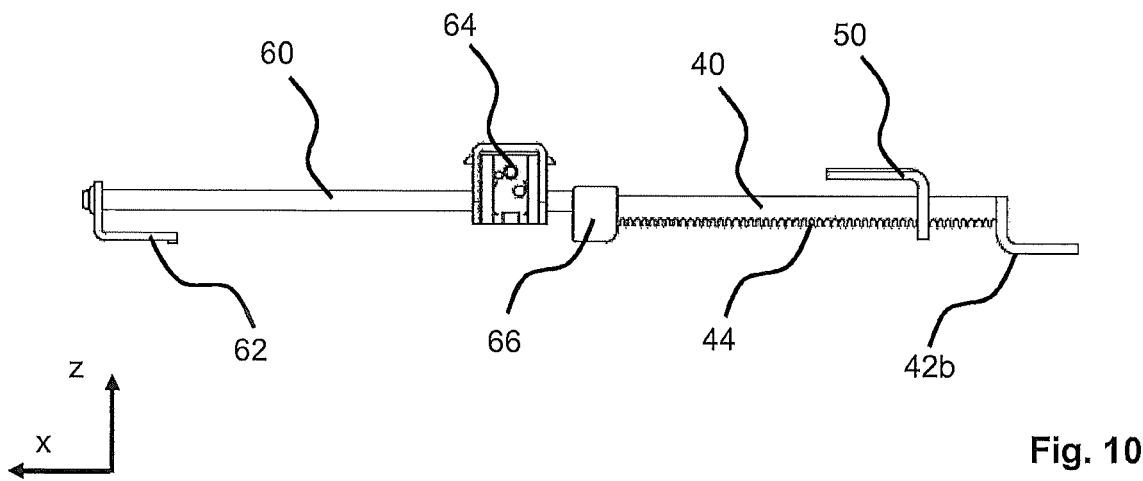

The invention is explained in more detail below with reference to advantageous exemplary embodiments which are illustrated in the figures. However, the invention is not restricted to these exemplary embodiments. In the figures:

FIG. 1: shows a schematic illustration of a vehicle seat according to the invention having a longitudinal adjuster according to the invention, FIG. 2: shows a perspective illustration of a pair of rails of a longitudinal adjuster according to the invention according to a first embodiment, FIG. 3: shows a longitudinal section of the pair of rails according to the first embodiment, FIG. 4: shows a perspective view of a rack and a securing profile according to the first embodiment, FIG. 5: shows a cross section of the pair of rails according to the first embodiment, FIG. 6: shows a longitudinal section of the pair of rails of a longitudinal adjuster according to a second embodiment, FIG. 7: shows a perspective view of a securing profile according to the second embodiment, FIG. 8: shows a perspective view of a pair of rails of a longitudinal adjuster according to a third embodiment, FIG. 9: shows a perspective view of a spindle of the longitudinal adjuster according to the third embodiment, and FIG. 10: shows a side view of the spindle of the longitudinal adjuster according to the third embodiment.

A vehicle seat 1 which is illustrated schematically in FIG. 1 will be described below using three spatial directions running perpendicularly to one another. With a vehicle seat 1 installed in the vehicle, a longitudinal direction x runs substantially horizontally and preferably parallel to a vehicle longitudinal direction which corresponds to the customary direction of travel of the vehicle. A transverse direction y running perpendicularly to the longitudinal direction x is likewise oriented horizontally in the vehicle and runs parallel to a vehicle transverse direction. A vertical direction z runs perpendicularly to the longitudinal direction x and perpendicularly to the transverse direction y. With a vehicle seat 1 installed in the vehicle, the vertical direction z runs parallel to the vehicle vertical axis.

The position specifications and direction specifications used, such as for example front, rear, top and bottom, relate to a viewing direction of an occupant seated in the vehicle seat 1 in a normal seat position, wherein the vehicle seat 1 is installed in the vehicle and is oriented in a use position suitable for passenger transport, with an upright backrest 4 and in the direction of travel as customary. However, the vehicle seat 1 may also be installed in a different orientation, for example transversally with respect to the direction of travel.

The vehicle seat 1 shown in FIG. 1 for a motor vehicle has a seat part 2 and a backrest 4 which is adjustable in its inclination relative to the seat part 2. The inclination of the backrest 4 can be adjustable, for example, by means of a latching fitting or a geared fitting. The vehicle seat 1 is mounted on a longitudinal adjuster 10 for adjusting a longitudinal position of the seat. The longitudinal adjuster 10 has a pair of rails 12. The pair of rails 12 is formed from a first seat rail 14, in particular for connecting to a seat structure, and from a second seat rail 16, in particular for connecting to a vehicle structure. The seat rails 14, 16 of the pair of rails 12 are displaceable relative to each other in the longitudinal direction x.

FIG. 2 shows the pair of rails 12 of the longitudinal adjuster 10 according to the invention for the vehicle seat 1 from FIG. 1. The pair of rails 12 comprises a first seat rail 14, in particular for connecting to a seat structure, and a second seat rail 16, in particular for connecting to a vehicle structure. The seat rails 14, 16 of the pair of rails 12 are displaceable relative to each other in the longitudinal direction x and mutually engage around each other, thereby forming an inner channel 18. A securing profile 50 is fastened to the first seat rail 14, in particular at a rear end of the first seat rail 14, in the inner channel 18. Furthermore, a rack 40 is arranged in the inner channel 18.

The rear end of the second seat rail 16 is engaged around by a profiled plate 20. The profiled plate 20 here is a sheet-metal bent part, in particular a profiled plate 20 bent in a substantially U-shaped manner. The profiled plate 20 is pushed from below onto the second seat rail 16 and is preferably connected fixedly to the second seat rail 16. The profiled plate 20 is preferably welded to the second seat rail 16. The profiled plate 20 has a plurality of beads which increase the rigidity of the profiled plate 20.

FIG. 3 shows a longitudinal section of the pair of rails 12 according to a first embodiment. FIG. 4 shows the rack 40 and the securing profile 50 of the pair of rails 12 from FIG. 3 in a perspective view.

The rack 40 has a toothing having downwardly directed teeth 44. The rack 40 is connected in a front portion 40a to the second seat rail 16. The rack 40 is connected in a front portion 40a to the second seat rail 16 by means of an adapter 42. The rack 40 is welded to the second seat rail 16. The rack 40 is led out of the inner channel 18 at a rear end of the pair of rails 12. The rack 40 is connectable in a rear portion 40b to a vehicle structure. The rack 40 is connectable in the rear portion 40b to a vehicle structure by means of an adapter 42b. The rack 40 can be screwed to the vehicle structure.

The securing profile 50 has a substantially L-shaped cross section. The securing profile 50 can be screwed to the first seat rail 14. A horizontal portion 50a of the securing profile 50 can be screwed to the first seat rail 14. The securing profile 50 has a through opening 52. A vertical portion 50b of the securing profile 50 has a through opening 52. The securing profile 50 engages around the rack 40. The rack 40 penetrates the through opening 52 of the securing profile 50. The securing profile 50 and the rack 40 are normally spaced apart from each other. They enter into engagement with each other in a form-fitting manner in reaction to a predetermined action of force, for example in the event of a crash.

According to the first embodiment, the teeth 44 of the rack 40 here have a tooth thickness d in the range of 3 mm to 5 mm. A load-bearing capacity of the engagement of the teeth is substantially defined by the tooth thickness d in conjunction with the number of loaded teeth.

The teeth 44 here have a tooth height h in the range of 2.5 mm to 5 mm. The teeth 44 have a tooth spacing a in the range of 3.5 mm to 6 mm. According to the first embodiment, a tooth spacing a between two adjacent teeth 44 is greater than the thickness of the vertical portion 50b of the securing profile 50.

The teeth 44 can have a rectangular or trapezoidal cross section. The teeth 44 of the toothing each have two tooth flanks 46 which are inclined toward each other in the direction of a tooth tip 48.

FIG. 5 shows a cross section of the pair of rails 12 according to the first embodiment. The vertical portion 50b of the securing profile 50 has an outer contour which follows the inner contour of the first seat rail 14 with a gap being formed in sections. The vertical portion 50b of the securing profile 50 fills the cross section of the inner channel 18 virtually completely with a gap encircling in sections being formed. The vertical portion 50b of the securing profile 50 serves in the event of a crash to prevent bending of the two outer portions, in the transverse direction y, of the first seat rail 14 inward. Furthermore, the profiled plate 20 which engages around the second seat rail 16 from below serves to prevent bending apart of the outer limbs, as viewed in the transverse direction y, of the second seat rail 16. In the interaction of the securing profile 50 and the profiled plate 20, peeling-off of the seat rails 14, 16, what is referred to as a peeling effect, is prevented. Said peeling effect is likewise reduced, if not even prevented, by the action of the securing profile 50 in conjunction with the rack 40, by the force acting upward on the first seat rail 14 in the vertical direction z being dissipated into the vehicle structure via the rack 40.

FIG. 6 shows the pair of rails 12 according to a second embodiment. The second embodiment corresponds to the first embodiment, unless expressly described otherwise. The toothing of the rack 40 according to the second embodiment is a helical toothing. The helical toothing can be produced by means of a thread cutting tool. It is furthermore conceivable that the rack 40 according to the second embodiment is a threaded spindle. The teeth 44 of the toothing have a tooth thickness in the range of 0.15 mm to 2 mm. The teeth 44 have a tooth height in the range of 0.25 mm to 1.5 mm.

FIG. 7 shows the securing profile 50 according to the second embodiment. The securing profile 50 has a mating toothing 54, which cooperates with the toothing of the rack 40, at least in the region of a lower wall of the through opening 52. A dimensioning of the mating toothing 54 substantially corresponds to a dimensioning of the teeth 44 of the toothing.

FIGS. 8 to 10 show different parts of the longitudinal adjuster 10 according to a third exemplary embodiment. According to the third exemplary embodiment of the longitudinal adjuster 10, the latter has, in the inner channel 18, a spindle 60 and an adjustment gearing 64 which is movable along the spindle. In order to adjust a longitudinal position of the seat, the adjustment gearing 64 can be driven by means of a motor (not shown). The spindle 60, in particular a front end portion of the spindle 60, is fixedly connected to the second seat rail 16 preferably by means of a spindle holder 62. As is shown in FIGS. 9 and 10, the rack 40 is arranged aligned in the longitudinal direction x behind the spindle 60. The spindle 60 and the rack 40 are connected to each other by means of a connecting adapter 66. The connecting adapter 66 can be fixed in the second seat rail 16. The connecting adapter 66 can serve as a rear end stop.

The features which are disclosed in the above description, the claims and the drawings may be of significance both individually and in combination for implementing the invention in its various refinements.

Although the invention has been described in detail in the drawings and the preceding description, the descriptions should be understood as being illustrative and exemplary and not restrictive. In particular, the choice of the graphically illustrated proportions of the individual elements should not be interpreted as required or restrictive. Furthermore, the invention is in particular not restricted to the exemplary embodiments explained. Further variants of the invention and the implementation thereof are apparent to a person skilled in the art from the preceding disclosure, the figures and the claims.

Terms such as "comprise", "have", "include", "contain" and the like which are used in the claims do not rule out further elements or steps. The use of the indefinite article does not rule out a plural. A single device can carry out the functions of a plurality of units or devices mentioned in the claims.

LIST OF REFERENCE SIGNS

1 Vehicle seat
2 Seat part
4 Backrest
10 Longitudinal adjuster
12 Pair of rails
14 First seat rail
16 Second seat rail
18 Inner channel
20 Profiled plate
40 Rack
40a Front portion (of the rack)
40b Rear portion (of the rack)
42a Adapter
42b Adapter
44 Tooth
46 Tooth flank
48 Tooth tip
50 Securing profile
50a Horizontal portion (of the securing profile)
50b Vertical portion (of the securing profile)
52 Through opening
54 Mating toothing
60 Spindle
62 Spindle holder
64 Adjustment gearing
66 Connecting adapter
a Tooth spacing
d Tooth thickness
h Tooth height
x Longitudinal direction
y Transverse direction
z Vertical direction

The invention claimed is:

1. A longitudinal adjuster for a vehicle seat, having at least one pair of rails, which is formed from a first seat rail for connecting to a seat structure, and from a second seat rail for connecting to a vehicle structure, wherein the seat rails of the pair of rails are displaceable in a longitudinal direction relative to each other and mutually engage around each other, thereby forming an inner channel, wherein a securing profile, which is fastened to the first seat rail, is arranged in the inner channel, wherein a rack which is fixed relative to the second seat rail is arranged in the inner channel, wherein the securing profile and the rack are normally spaced apart from each other and enter into engagement with each other in a form-fitting manner in reaction to a predetermined action of force, wherein the securing profile engages around the rack such that the rack penetrates a through opening of the securing profile.

2. The longitudinal adjuster as claimed in claim 1, wherein the rack has a toothing with downwardly directed teeth.

3. The longitudinal adjuster as claimed in claim 2, wherein the teeth of the toothing each have two tooth flanks which are inclined toward each other in the direction of a tooth tip.

4. The longitudinal adjuster as claimed in claim 3, wherein the teeth have a rectangular or trapezoidal cross section.

5. The longitudinal adjuster as claimed in claim 2, wherein the toothing of the rack is a helical toothing.

6. The longitudinal adjuster as claimed in claim 2, wherein the teeth have a tooth thickness in a range of 0.2 mm to 5 mm.

7. The longitudinal adjuster as claimed claim 2, wherein the teeth have a tooth height in a range of 1 mm to 5 mm.

8. The longitudinal adjuster as claimed in claim 1, wherein the rack is connected by a weld at least in a front portion of the second seat rail via an adapter.

9. The longitudinal adjuster as claimed in claim 1, wherein the rack is guided out of the inner channel to a rear end of the pair of rails and is connectable in a rear portion to a vehicle structure via an adapter.

10. The longitudinal adjuster as claimed in claim 1, wherein the securing profile has a substantially L-shaped cross section.

11. The longitudinal adjuster as claimed in claim 1, wherein the securing profile can be screwed to a horizontal portion of the first seat rail.

12. The longitudinal adjuster as claimed in claim 1, wherein the securing profile has a through opening in a vertical portion.

13. The longitudinal adjuster as claimed in claim 1, wherein the rack is arranged aligned in the longitudinal direction behind a spindle of a motor-adjustable longitudinal adjuster.

* * * * *